United States Patent [19]

Norling

[11] 4,139,736
[45] Feb. 13, 1979

[54] CENTRAL OFFICE COIN REPEATER MODIFICATION CIRCUIT

[75] Inventor: Thomas B. Norling, Lakeland, Fla.

[73] Assignee: Akzona Incorporated, Asheville, N.C.

[21] Appl. No.: 866,119

[22] Filed: Dec. 30, 1977

[51] Int. Cl.² .................................. H04M 17/02
[52] U.S. Cl. ...................................... 179/6.3 R
[58] Field of Search .............. 179/6.3 R, 6.4, 6.5, 179/18 DA, 90 D

[56] References Cited

U.S. PATENT DOCUMENTS

| | | | |
|---|---|---|---|
| 2,835,738 | 5/1958 | Quatman | 179/6.3 R |
| 3,449,524 | 6/1969 | Pharis | 179/6.3 R |
| 3,676,597 | 7/1972 | Peterson | 179/6.3 R |
| 3,678,203 | 7/1972 | Lorange | 179/6.3 R |
| 3,737,576 | 6/1973 | Spencer | 179/6.3 R |
| 3,992,588 | 11/1976 | Hunsicker | 179/6.3 R |
| 4,063,036 | 12/1977 | Hunsicker | 179/6.3 R |

Primary Examiner—Kathleen H. Claffy
Assistant Examiner—Gerald L. Brigance
Attorney, Agent, or Firm—Francis W. Young; David M. Carter

[57] ABSTRACT

There is provided a modification circuit for prepay telephone central office coin repeaters. The modification circuit includes an improved coin detector circuit that may be used with a circuit for providing coin-free dialing for certain predetermined numbers including selected service codes and operator access. The repeater modification circuit is adapted to be connected directly to and mounted with an electromechanical central office coin repeater.

14 Claims, 4 Drawing Figures

CENTRAL OFFICE COIN REPEATER MODIFICATION CIRCUIT

BACKGROUND OF THE INVENTION

This invention relates to a modification circuit for a telephone coin repeater. More particularly, it relates to a circuit adapted to provide improved coin detection and coin-free dialing for selected service codes and operator access in existing telephone coin repeaters without replacing the entire repeater. The telephone coin repeater, also known as an adapter, is normally an electromechanical device situated in the central office electrically coupled between the line feeder and access equipment in the central office. One of the purposes of the repeater is to detect the presence of a coin at a telephone pay station and, if a coin is present, to repeat the digits dialed in a form acceptable to the central office for switching through the call. An example of a coin repeater is disclosed in U.S. Pat. No. 2,835,738, issued May 20, 1958, and assigned to the General Telephone Laboratories, Inc., and U.S. Pat. No. 3,449,524, issued June 10, 1969, and assigned to Stromberg-Carlson Corporation. The disclosures set forth in these patents are hereby incorporated by reference.

One of the problems with existing electromechanical coin repeaters is their lack of versatility in providing coin-free dialing for selected service codes and operator access which many public utility commissions are now requiring.

Coin-free service has been provided by completely removing existing electromechanical repeaters and replacing them with an electronic circuit capable of providing these functions. However, this is a rather expensive way to provide a coin-free service, particularly since most of the relays and other equipment in the electromechanical repeaters are still viable circuits.

Another problem with existing electromechanical repeaters is that coin signals from pay stations were detected by a relay action. This type of arrangement is susceptible to false indications that a coin is present due to false ground and transient signals.

Another means for providing coin-free service has been to modify the pay station itself, however, it is obviously very expensive to modify each pay station rather than to modify the central office itself.

OBJECTS OF THE INVENTION

It is one object of this invention to provide a modification circuit for a central office coin repeater having improved coin detection mounted with the repeater relays.

It is another object of this invention to provide a modification circuit for a control office coin repeater for enabling coin-free dialing for selected service codes and operator access.

SUMMARY OF THE INVENTION

In accordance with one form of this invention, there is provided a modification circuit for a central office repeater. The modification circuit is directly connected to and mounted with the coin repeater. The modification circuit includes means for detecting the presence or absence of a coin at a pay station for a predetermined time after a digit is dialed. A holding circuit is included to hold the repeater during the predetermined time while a coin check is being made. A digit analyzer and programmed logic circuit are further provided to permit coin-free calls for certain predetermined digits by not permitting a restriction action to take place on the programmed call set up.

BRIEF DESCRIPTION OF THE DRAWINGS

The subject matter regarded as the invention is set forth in the appended claims. The invention itself, however, together with further objects and advantages thereof, can be better understood by reference to the following description taken in conjunction with the accompanying drawing in which:

DESCRIPTION OF THE PREFERRED EMBODIMENT

Figure 1:
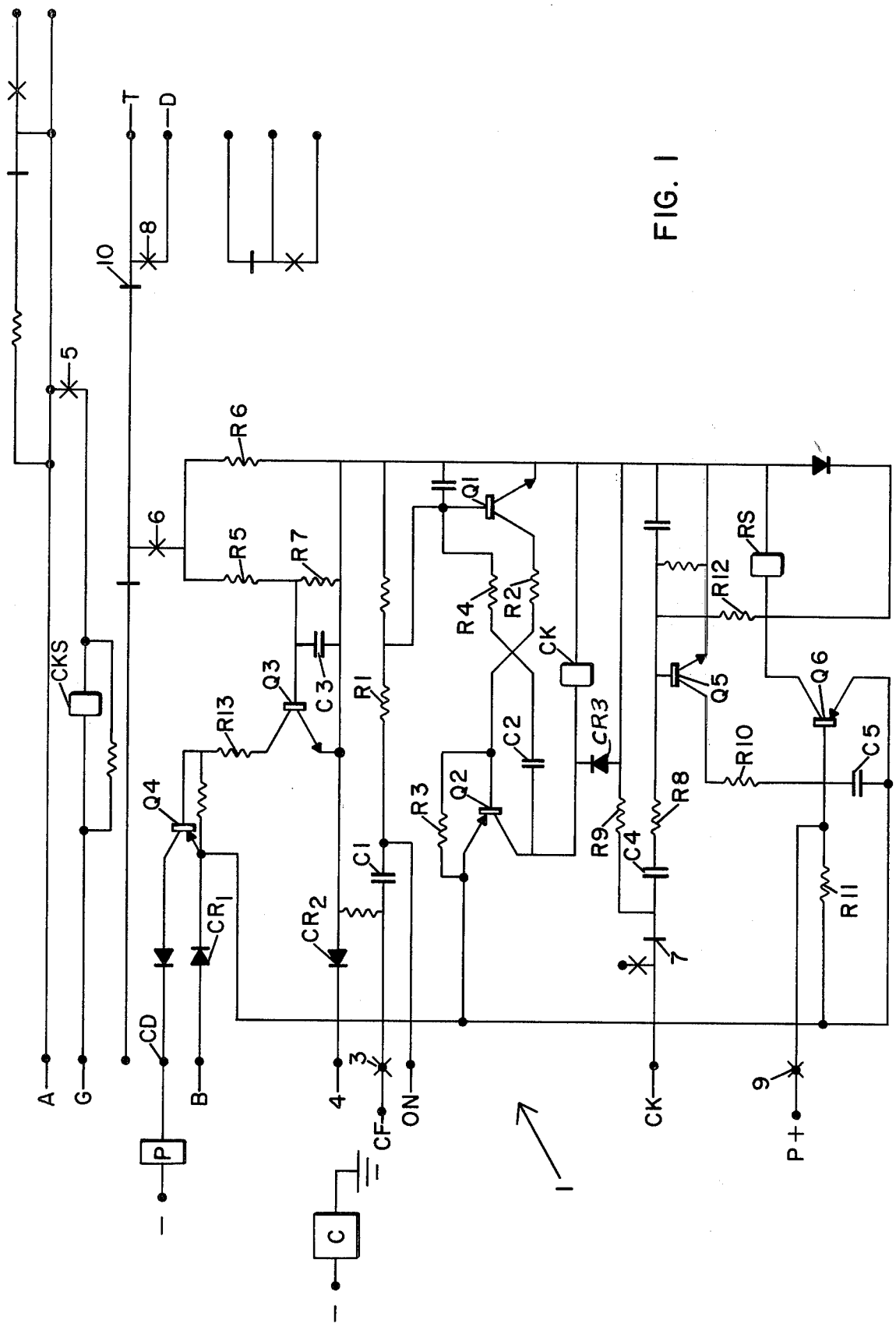
FIG. 1 is a schematic circuit diagram of a portion of a repeater modification circuit incorporating features of the present invention.
Figure 2:
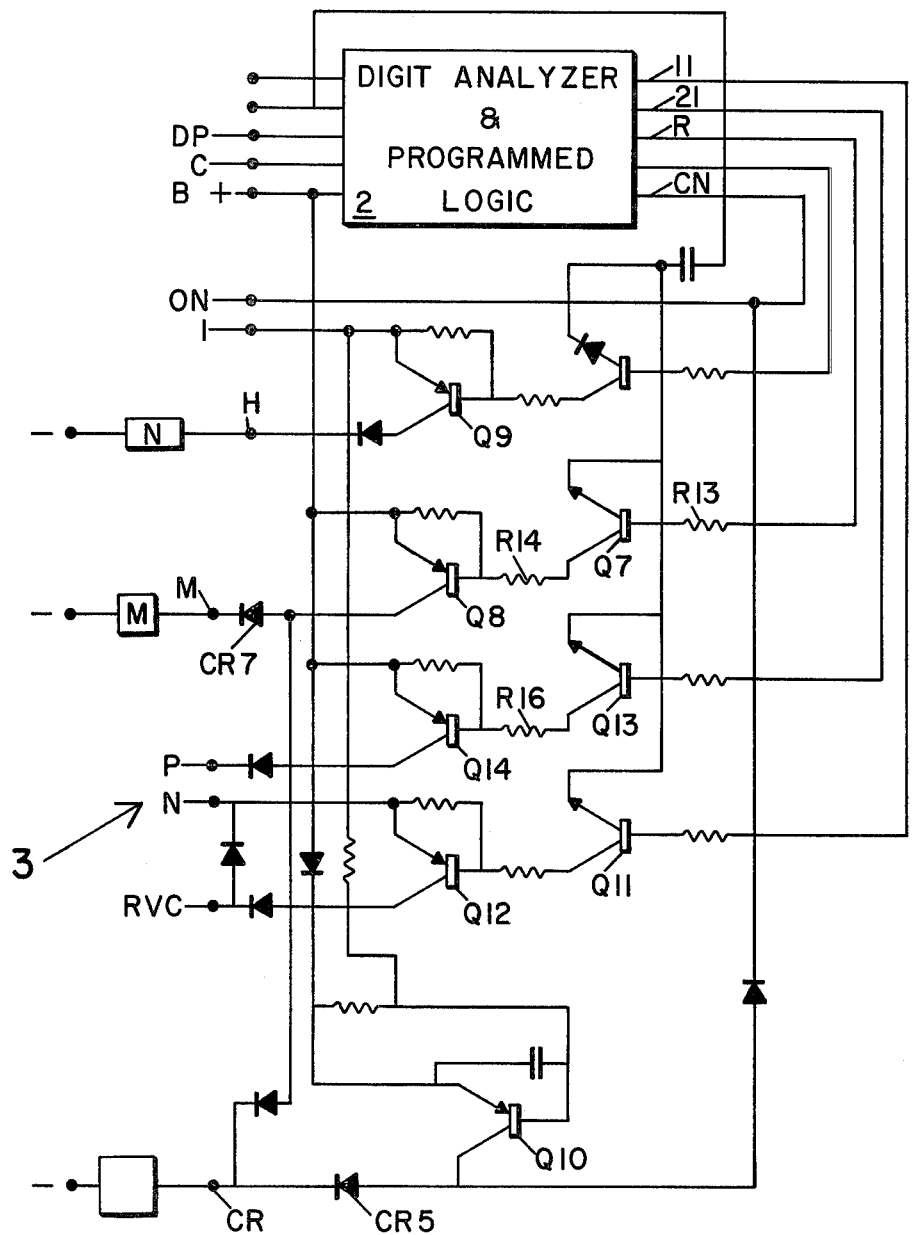
FIG. 2 is a schematic circuit diagram of another portion of a repeater modification circuit incorporating features of the present invention.

Referring now to FIGS. 1 and 2, there is provided a repeater modification circuit including coin check circuit 1, shown in FIG. 1, a digit analyzer and programmed logic circuit 2, and control circuit 3 shown in FIG. 2. The modification circuit including the coin check circuit, the digit analyzer and the programmed logic circuit and control circuit are adapted to be connected to and physically mounted inside a coin repeater box in a telephone central office. This will be more fully explained in reference to FIGS. 3 and 4. In this embodiment, the modified repeater is a G.T. & E. Automatic Electric Repeater Circuit H61876BT, portions of which are shown in the accompanying drawings. A full disclosure of all of the components of the H61876BT Repeater Circuit is available by contacting the Automatic Electric Company of Chicago, Ill. G.T. & E. Automatic Electric Repeater Circuit H61876BT is hereby incorporated by reference. Other repeaters, or adapters, such as Stromberg-Carlson Adapters and Western Electric Repeaters could also be modified using applicant's invention without departing from the scope of this invention.

Referring now to the coin check portion of the circuit, shown in FIG. 1, there is provided a mechanism for checking a coin ground signal from a coin telephone pay station and transmit this coin information to a portion of the repeater where it is stored for future circuit functions. A secondary function of the coin check circuit is to set up a restriction operation while monitoring the originating loop for an on-hook condition. When the call originator returns to the on-hook, the restrict circuitry is reset. The coin check circuit 1 initiates a coin check sequence in response to a positive going signal on the CF lead or in response to a positive signal on the ON lead from the digit analyzer and programmed logic circuit 2 of FIG. 2. The coin repeater C function relay receives dialing pulses from the Pulse Repeating circuit (not shown) which in turn receives dialing pulses from the telephone pay station. For each positive going pulse through the C relay a pair of contacts 3 are closed and couple the signal to the CF terminal. The CF terminal is connected to capacitor C1 in the coin check circuit. C1 is in turn coupled to the base of transistor Q1 through a resistor R1. The collector of transistor Q1 is connected to power supply terminal B through resistor R2, resistor R3 and diode CR1. The base of transistor Q2 is connected to the junction of resistors R2 and R3. Thus, when transistor Q1 comes on due to the positive signal on the CF terminal, transistor Q2 will also come on. The collector of transistor Q2 is connected through relay coil CK and diode CR2 to terminal 4 which is a source of DC supply. Thus, when Q2 is turned on, relay coil CK is energized. The collector of transistor Q2 is cross-coupled to the base of transistor Q1 through a series combination of capacitor C2 and resistor R4. The charge on capacitor C2, due to Q2 conducting, will hold transistor Q1 and the conductive, in this embodiment, for approximately 150 milliseconds.

When relay coil CK energizes, relay contacts 5, which are magnetically coupled to coil CK, close and current flows between battery feed terminal A through relay coil CKS to terminal G. If the subscriber is off-hook, then there is current through repeater loop battery relay A (not shown) and the CKS relay is energized. This will provide a holding bridge for the forward switch train from battery feed A. Thus the repeater will be on hold and will not drop out during coin check, which will be described below.

Energizing the CKS relay coil will also connect the tip conductor T of the coin telephone loop through the electronic coin ground detection circuit network including, inter alia, transistor Q3 and Q4. This connection is provided by the closure of contacts 6, which are magnetically coupled to coin CKS. Contacts 6 are connected to tip conductor T and one side of resistors R5 and R6. Resistor R6 is connected across a series combination of voltage divider resistors R5 and R7. Capacitor C3 is connected in parallel with resistor R7 and across the base-emitter junction of transistor Q3. This resistor capacitor network provides a time delay of approximately 60 milliseconds before the coin test is actually made. The delay allows the tip side of the line to be relieved of transients and noise before the coin test is made, thus preventing false coin ground detection. If there is not a positive signal, indicating a coin ground, on the tip conductor, the CK relay releases, transistor Q3 remains off. Relay coin P, therefore, does not energize.

Transistor Q5 turns on due to the closing of relay contacts 7 which are magnetically applied to coil CK. Capacitor C4 is connected to relay contacts 7 which in turn is connected to terminal CK which is grounded. The other side of capacitor C4 is connected to the base of transistor Q5 through resistor R8. R9 is connected between the junction of one side of capacitor C4 and relay contacts 7, and diode CR3. Diode CR3 is connected to one side of relay coil CK. When Q5 turns on due to a positive signal on its base from CK, collector current is supplied through resistor R10, resistor R11 charges capacitor C5. This latches on transistor Q6 which has capacitor C5 connected across its base and emitter. Collector current is supplied to transistor Q6 through R12 which is also connected to the base of transistor Q5.

Furthermore, current flows through relay coil RS, which energizes, when transistor Q6 comes on. When relay coil RS is energized, relay contacts 8 close. Contacts 8 are connected to the D lead which may be connected to a busy signal or a recording. The closure of contacts 8 places a recording or busy signal on the tip conductor T and indicates to the call originator at the paystation that there is no coin present at the paystation. Furthermore, contacts 10, which are also magnetically coupled to coil RS, open, thus restricting the call. The originator then may go back on-hook causing the circuit to reset.

If there is a coin ground detected in the above CKS relay sequence, transistor Q3 will turn on due to a coin signal on its base from tip conductor T. Transistor Q4, which has its base connected to the collector of Q3 through resistor R13, will then turn on. This will apply a positive ground signal on the CD lead. A positive signal on lead CD causes relay coil P in the repeater to energize. Relay coil P is the coin ground detection relay in the repeater and is magnetically coupled to contacts 9. A positive ground signal is applied to the P lead from relay contacts 9 preventing transistor Q6 from coming on when relay CK turns off. Therefore, relay contacts 8 do not close and no recording or busy signal is applied to the tip line, thus restriction does not take place due to the presence of the proper coin. Voice transmission, therefore, is allowed on the tip line because the contact 10 remains closed.

It should be noted that before the modification circuit was adapted, there was a portion of an L relay coil (not shown) used in the voice transmission path causing a reduction in voice quality and acted an impedance. With the addition of the modification circuit, this portion of the L relay has been removed, thus alleviating the voice transmission problem and reducing loop impedance thus extending possible loop length.

The coin check circuit 1 also provides a mechanism for the digit analyzer and programmed logic circuit 2 and control circuit 3 to set up a programmed coin check sequence for coin-free dialing as well as refund sequence for preselected or predetermined numbers such as service codes and operator access.

The circuit 2, indicated by the block diagram, may be a known circuit for analyzing digits to provide coin free dialing for certain numbers and to provide restriction signals for the numbers. Examples of such circuits are disclosed in U.S. Patent application Ser. No. 829,557 and U.S. Pat. No. 3,992,588, both assigned to Akzona Incorporated, assignee of the present application.

A high logic signal on the ON lead will cause the coin check circuit 1 to operate exactly the same as if there were a high logic signal on the CF lead as previously described. In order to obtain a high logic signal on the ON lead of the coin check circuit, the analyzer and programmed logic circuitry 2 must be operating.

Circuit 2 monitors the repeater C lead, the B lead and DP lead inputs for high level logic signals from the repeater. When the repeater is in a seizure sequence, that is, positive ground signals are applied to the B, C, and DP inputs, the analyzer is able to analyze dial input signals received at DP input terminal.

A high logic signal on the CN lead indicates that a local call (normally seven digits) has been dialed. These signals applied to the CN and, as well as CR lead, will set up circuit functions within the modified repeater equipment to apply coin-refund battery to the call originator loop circuit and to make use of the coin check circuit 1 as described previously, particularly to provide a holding bridge for the central office equipment during coin refund, which will be explained later.

The high CN signal is passed to the ON output lead on the coin check circuit 1 shown in FIG. 1. This signal activates the CK relay and a coin check cycle begins as previously described, particularly providing a holding bridge during M relay action. A signal is applied to the terminal R from the digit analyzer and programmed logic circuit 2 indicating a coin free call has been made so that a coin which might have been deposited by mistake may be refunded. This signal on terminal R turns on transistor Q7 through resistor R14. Transistor Q7, which has its collector connected to the base of transistor Q8 through resistor R14, drives transistor Q8 into conduction. Transistor Q8 applies a positive ground signal to the M lead via diode CR4 as well as the B lead input. The positive signal on the M lead operates the coin control relay which is connected to transistor Q8 and the M relay in the repeater, thus refunding any coin which may have been inserted at the paystation. The I lead then goes from positive ground to a 5,000 OHM path to negative battery because of the operation of the M relay in the repeater. The disables transistor Q9 which also prevents an H output signal. Connecting the I lead to negative battery energizes the transistor Q10 which provides a positive ground signal on the output of the CR lead via protective diode CR5. Current flows through the C relay providing a high on the CF lead in the coin check circuit 1 of FIG. 1, causing activation or energization of the CK relay to provide the central office holding circuit under the control of the repeater as previously described. The coin refund is thus provided and the coin check circuit 1 thus minimizes the chances of false coin detection by providing a fixed timing sequence for coin check and coin control.

The coin operation sequence must be cleared before any additional action within the repeater can take place. When the coin refund sequence has been completed, the coin relay M in the repeater returns to normal and the battery signal on the I lead is replaced by positive ground signal. This causes a positive ground to be applied to the H lead through transistor Q9. Q10 then turns off at the same time, causing the positive ground signal of the CR lead and the high on the CF lead to be removed. The low on the CF lead causes the CK relay to reset. The low on the CR lead causes the C function relay and repeater to restore.

Q9 applied positive ground to the repeater switch-through N relay causing it to operate. The repeater will switch through and cause the modification circuit to return to an idle condition waiting for another call set up. The repeater will now function in a standard completed call manner and the call can be handled with standard operating sequence similar to any other type switched through call. The 11N service codes are handled in the same manner as the above described N11 calls and no operating sequence will be discussed.

A high logic signal on line 21 from the digit analyzer and programmed logic circuit 2 indicates that the caller has made, in this embodiment, more than three dial pulls. Three dial pulls are, of course, used in service codes (N11 and 11N). Q13, which has its base connected to line 21 through resistor R16, is turned on by a positive signal on its base. Transistor Q14, which has its base connected to the collector of transistor Q13, turns off due to the conduction of Q13. This opens contacts 9 connected to the P lead shown in FIG. 1. Transistor Q6, which is the restricted transistor, may now conduct, providing restriction of the call if a coin is not deposited as previously described.

Coin-free TSPS operator access sequence acts in a similar manner to the service call set-up. After the digit analyzer and programmed logic circuitry has determined that a TSPS call is being attempted, a signal is applied from line 11 to the base of transistor Q11 turning it off. This will cause transistor Q12 to turn off, removing the positive ground signal from the RVC lead. A low signal on the RVC lead prevents D relay, called the reverse loop correcting relay, in the repeater from operating. The reverse loop correcting relay is present in most repeaters and enables TSPS reverse loop supervisory signals to reach the originating point equipment. The supervisory signal disables the key pad to prevent fraudulent dialing and re-arms to coin totalizer to the paystation.

Figure 3:
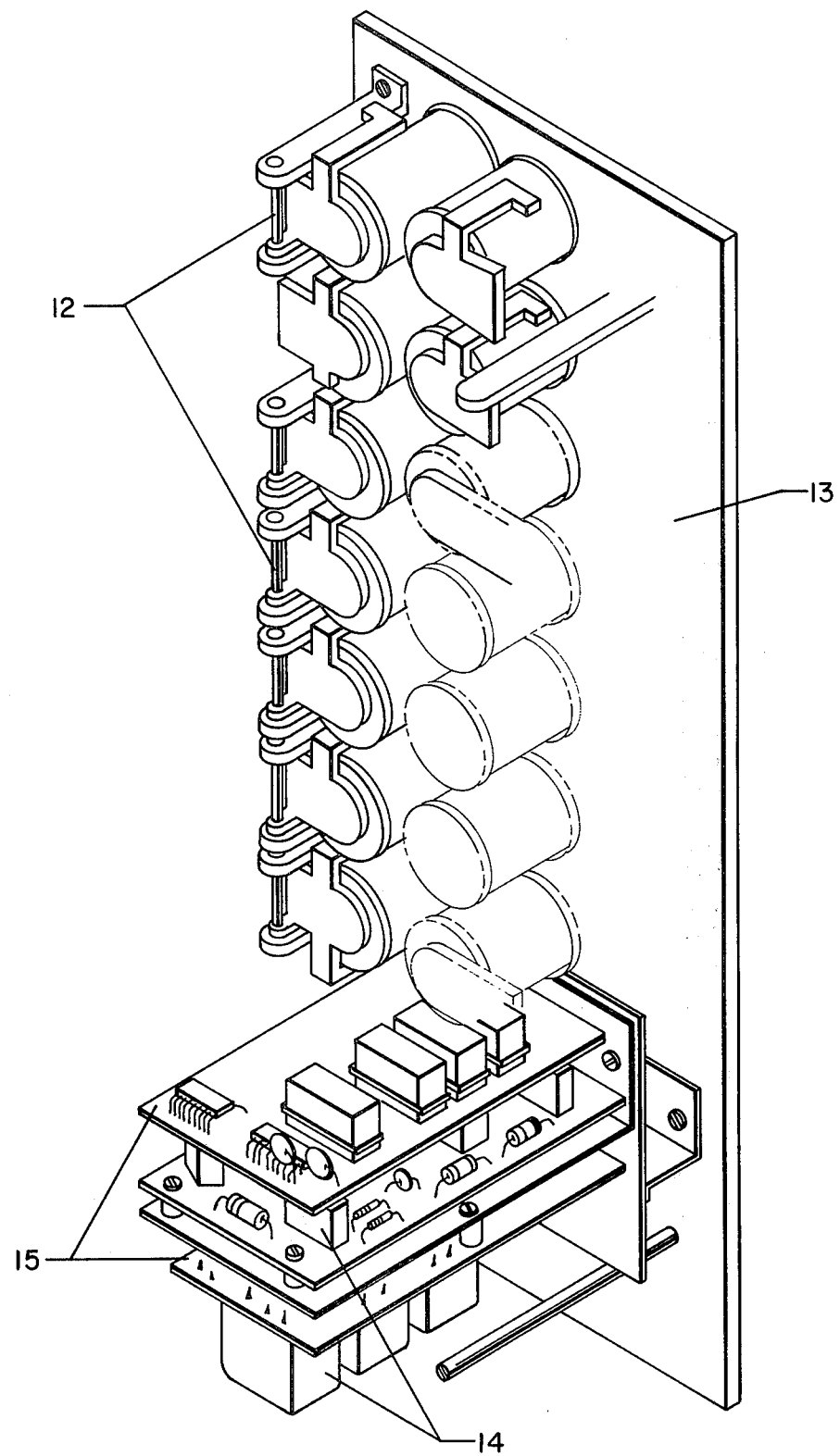
FIG. 3 is a isometric view of the electromechanical repeater modified using mounted circuit cards incorporating another feature of the invention.
Figure 4:
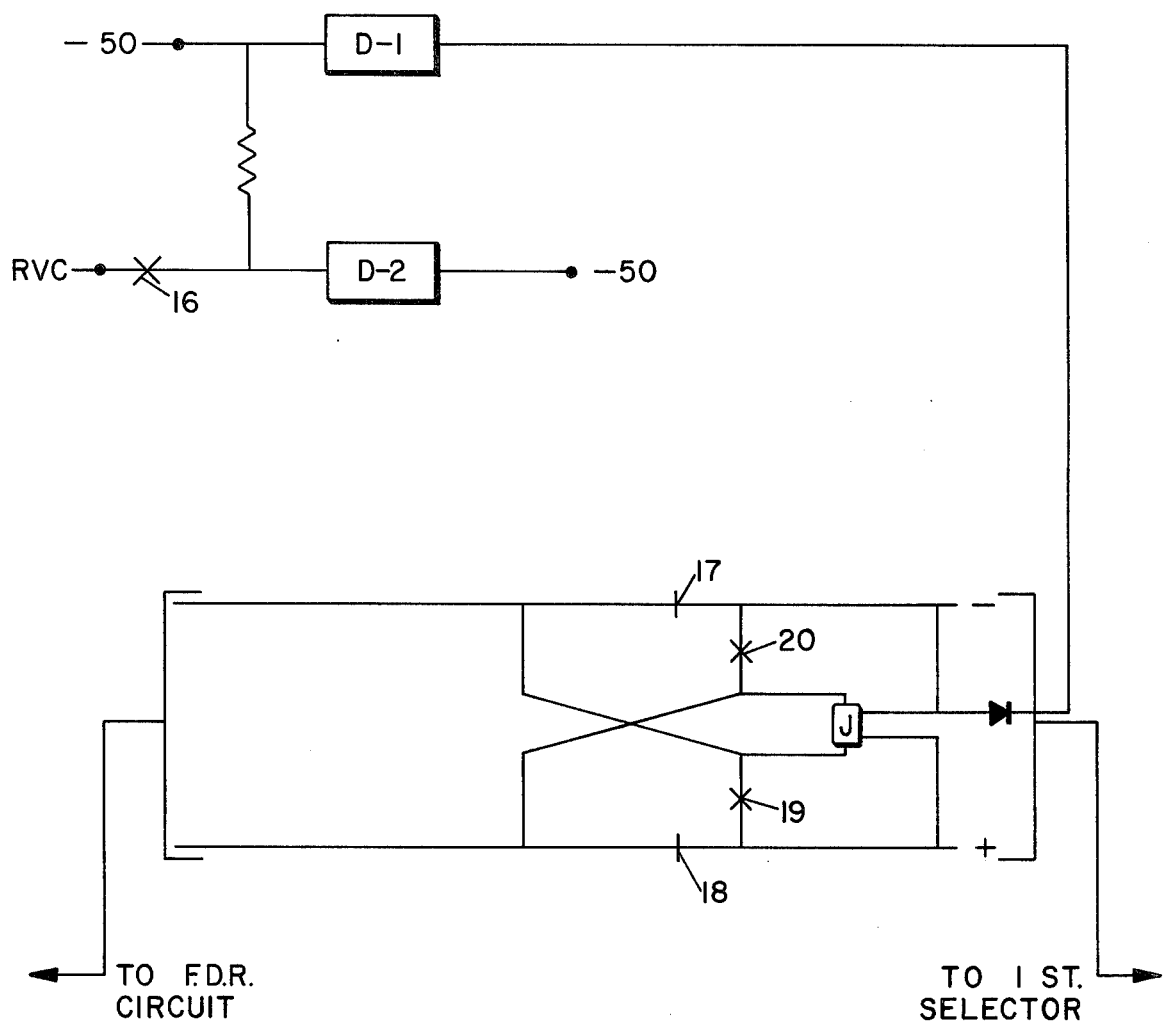
FIG. 4 is a schematic circuit diagram of a portion of a repeater circuit incorporating still another feature.

The circuitry described above is adapted to be assembled on P.C. boards and then mounted onto the repeater frame as illustrated in FIG. 3. The repeater includes a plurality of relays 12 mounted on frame 13.

The modified circuit 14 is assembled on P.C. boards 15 which are adapted to be mounted on the lower portion of frame 13. A trough shaped cover (now shown) may be placed over the relays 12 and P.C. boards 15 for protection. Prior to modification, there was an S relay mounted in the lower portion of frame 13. The S relay was used to restore the reverse loop correcting D relay. The S relay has been removed to make room on the frame, and under the cover, for mounting the modification circuit P.C. boards 15.

In order to provide the equivalent S relay function, resistor R15 was connected between the two windings of the D relay, indicated as D-1 and D-2. This resistor R15 restores (turns off) the D relay by the application of an equal potential ($-50v$) on both sides of D-2 when relay contacts 16 are open. Relay contacts 16 are magnetically coupled to the J relay, which is the control office loop monitor relay and control the P relay. The D relay is magnetically coupled to contact sets 17, 18, 19, and 20. Contacts 19 and 20 close while the D relay is energized, thus reversing the loop. When the J relay signals for reverse loop correction, contacts 16 close, this de-energizing the D-2 relay, as described above. This opens contacts 19 and 20, and closed contacts 17 and 18 for normal operation.

Thus the S relay may be replaced to provide mounting room for the repeater modification circuitry, which provides the improved features set forth herein, without inhibiting with other normal repeater functions such as reverse loop correction.

From the foregoing description of the embodiment of the invention, it should be apparent that many modifications may be made therein. It will be understood, however, that this embodiment of the invention is intended as an exemplification of the invention only, and that the invention is not limited thereto. For example, the coin check portion of the circuit 1 has been designed so that it would function with both the older 3 slot, prepay coin telephones which use a continuous ground path indicating coin deposit as well as the newer single slot telephones with ground isolation relays. Furthermore, the coin check circuit may also act as a signal detector circuit, e.g. for party identification without significant departing from applicant's circuit. It will be understood, therefore, that it is intended for the impending claims to cover all modifications that fall within a true scope of the invention.

I claim:

1. An improved coin check circuit for use with a prepay coin telephone repeater circuit comprising:
   a holding bridge;
   a pair of conductors, said holding bridge including an impedance device and a switch;

said holding bridge adapted to be connected across said conductors upon closure of said switch;
timing circuit means;
said switch responsive to said timing circuit means for closing said switch for a predetermined period;
said timing circuit means being initiated by dial pulses;
means for sensing a coin signal;
said means for sensing activated during said predetermined period.

2. A circuit as set forth in claim 1 wherein said holding bridge is adapted to be in a circuit relation with a telephone central office.

3. A circuit as set forth in claim 2 wherein the circuit path between the central office and a telephone paystation is disconnected during said predetermined period.

4. A circuit as set forth in claim 1 wherein said coin signal is due to an actual coin ground present at the coin telephone.

5. A circuit as set forth in claim 1 further including a digit analyzer and programmed logic circuit connected to said coin check circuit for providing coin free service for certain predetermined numbers.

6. A circuit as set forth in claim 1 further including restriction means connected to said means for sensing a coin signal; said restriction means being disabled when a coin ground is present.

7. A circuit as set forth in claim 1 wherein a coin check relay is obviated from said circuit by said improved coin check circuit whereby loop impedance is substantially reduced.

8. A circuit as set forth in claim 5 further including means for signaling a relay in said repeater for returning a coin in a paystation when the number dialed is analyzed to be a coin-free number.

9. A circuit as set forth in claim 5 further including restriction means; said restriction means being disabled when said predetermined numbers are dialed.

10. An improved coin check circuit adapted to be connected in a circuit relationship with a coin repeater comprising:
a first input terminal for receiving a signal from a telephone coin paystation indicating the presence of a coin;
first switch means connected to said first input terminal for detecting said signal from said paystation;
a second input terminal adapted to be connected to said coin paystation for receiving a dial pulse train;
a second switch means connected to said second input terminal and being energized by said dial pulse train;
said second switch enabling said first switch to provide detection of the presence or absence of a coin for a predetermined period.

11. A circuit as set forth in claim 10 further including an audible signal adapted to be connected to the paystation;
means to switch said audible signal to said paystation indicating the absence of a coin during one condition of said first switch.

12. A circuit as set forth in claim 10 further including a holding circuit for holding the central office during coin check; said holding circuit being activated in response to a signal on said second input terminal.

13. A circuit comprising an electromechanical telephone coin repeater, a restriction circuit, a programmed digit analyzer connected to said repeater for determining coin-free numbers, said programmed digit analyzer receiving telephone digits from a paystation, means for controlling said repeater in response to said digit analyzer for providing coin-free service for certain predetermined numbers, an electronic coin check circuit responsive to said programmed digit analyzer for disabling said restriction circuit in response to predetermined signals from said programmed digit analyzer, said electronic coin check circuit providing substantially lower looped impedance to the telephone paystation relative to relay coil-type coin detectors.

14. A circuit as set forth in claim 13 wherein said circuit is adapted for use with a touch tone to rotary converter.

* * * * *